US009565274B2

(12) United States Patent
Rudow et al.

(10) Patent No.: US 9,565,274 B2
(45) Date of Patent: *Feb. 7, 2017

(54) SYSTEMS, METHODS AND DEVICES FOR TRIP MANAGEMENT FUNCTIONS

(75) Inventors: Richard Rudow, Mesa, AZ (US); James M. Janky, Los Altos, CA (US); Robert Joseph Allen, Chandler, AZ (US); Craig Howard, Chandler, AZ (US)

(73) Assignee: Trimble Inc., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/271,653

(22) Filed: Nov. 14, 2008

(65) Prior Publication Data

US 2009/0070033 A1 Mar. 12, 2009

Related U.S. Application Data

(62) Division of application No. 10/971,354, filed on Oct. 22, 2004, now abandoned.

(51) Int. Cl.
*G01C 21/30* (2006.01)
*G01C 21/32* (2006.01)
(Continued)

(52) U.S. Cl.
CPC .............. *H04L 67/34* (2013.01); *G01C 21/20* (2013.01); *G06F 17/3087* (2013.01);
(Continued)

(58) Field of Classification Search
CPC .... H04L 67/18; G06F 17/3087; G01S 5/0009; H04M 1/72561
(Continued)

(56) References Cited

U.S. PATENT DOCUMENTS 5,025,261 A 6/1991 Ohta et al.
5,396,431 A 3/1995 Shimizu et al.
(Continued)

FOREIGN PATENT DOCUMENTS

CA 2163215 11/1994
CN 1428596 7/2003
(Continued)

OTHER PUBLICATIONS

Non Final Office Action mailed on Mar. 30, 2010, for U.S. Appl. No. 12/271,630, 10 pages.
(Continued)

*Primary Examiner* — Harry Oh
(74) *Attorney, Agent, or Firm* — Kilpatrick Townsend & Stockton LLP

(57) ABSTRACT

A Web based application system for managing a trip. The Web based application system for managing a trip includes a graphical user interface for allowing a client computer coupled to a network to access a server computer to retrieve and store data relating to the trip therewith, one or more interactive windows functioning with the graphical user interface to perform the retrieving and the storing such that the data include a Web document and the graphical user interface and the interactive windows include a first application, and a wireless device interface for allowing a portable device wirelessly coupled, with a cellular telephone system, with the network to access the Web document. The portable device includes a cellular telephone functionality, a geo-locating functionality and a processor for processing the Web document. The processing helps manage the trip. Downloading and processing the Web document include a second application.

12 Claims, 13 Drawing Sheets

(51) Int. Cl.
*H04L 29/08* (2006.01)
*G01C 21/20* (2006.01)
*G06F 17/30* (2006.01)
*G06Q 30/04* (2012.01)
*H04W 4/02* (2009.01)
*H04W 4/18* (2009.01)
*H04W 4/20* (2009.01)

(52) U.S. Cl.
CPC ............. *G06Q 30/04* (2013.01); *H04L 67/04* (2013.01); *H04L 67/18* (2013.01); *H04L 69/329* (2013.01); *H04W 4/02* (2013.01); *H04W 4/18* (2013.01); *H04W 4/20* (2013.01)

(58) Field of Classification Search
USPC ........ 701/200, 207, 208, 213; 340/990, 995, 340/996; 342/190, 191, 357.06, 357.13
See application file for complete search history.

(56) References Cited

U.S. PATENT DOCUMENTS

| | | | | |
|---|---|---|---|---|
| 6,023,241 | A * | 2/2000 | Clapper | G01S 19/14 342/357.32 |
| 6,144,338 | A | 11/2000 | Davies | |
| 6,198,431 | B1 | 3/2001 | Gibson | |
| 6,405,123 | B1 * | 6/2002 | Rennard | G01C 21/26 340/988 |
| 6,480,783 | B1 | 11/2002 | Myr | |
| 6,615,131 | B1 * | 9/2003 | Rennard | G01C 21/26 342/357.31 |
| 6,643,584 | B1 * | 11/2003 | Ikeuchi | G01C 21/32 340/988 |
| 6,850,844 | B1 * | 2/2005 | Walters | G01C 21/20 701/410 |
| 6,882,935 | B2 | 4/2005 | Chun | |
| 6,965,829 | B2 * | 11/2005 | Yamadaji et al. | 701/301 |
| 6,980,826 | B2 * | 12/2005 | Yamaguchi | H04W 88/02 340/12.5 |
| 7,146,369 | B2 | 12/2006 | White et al. | |
| 7,158,878 | B2 | 1/2007 | Rasmussen et al. | |
| 7,342,516 | B2 * | 3/2008 | Kato et al. | 340/995.19 |
| 7,379,811 | B2 | 5/2008 | Rasmussen et al. | |
| 7,453,491 | B2 | 11/2008 | Kinjo | |
| 7,454,090 | B2 | 11/2008 | Wilcock et al. | |
| 7,460,953 | B2 | 12/2008 | Herbst et al. | |
| 7,490,294 | B2 | 2/2009 | Okada | |
| 7,716,013 | B2 | 5/2010 | Orth et al. | |
| 8,560,237 | B2 | 10/2013 | Rudow et al. | |
| 2002/0111139 | A1 * | 8/2002 | Nishiyama | H04W 4/02 455/41.3 |
| 2002/0167442 | A1 | 11/2002 | Taylor | |
| 2003/0158891 | A1 | 8/2003 | Lei et al. | |
| 2004/0034469 | A1 | 2/2004 | Kim | |
| 2004/0036649 | A1 | 2/2004 | Taylor | |
| 2004/0128068 | A1 * | 7/2004 | Chun | G01C 21/32 701/453 |
| 2004/0167706 | A1 * | 8/2004 | Becker | G01S 5/0009 701/467 |
| 2004/0217980 | A1 * | 11/2004 | Radburn | G06F 17/3028 345/672 |
| 2004/0243299 | A1 * | 12/2004 | Scaer | G08G 1/202 701/522 |
| 2006/0080032 | A1 * | 4/2006 | Cooper | G01C 21/32 701/532 |
| 2006/0089793 | A1 | 4/2006 | Rudow et al. | |
| 2006/0271288 | A1 * | 11/2006 | Bruelle-Drews | G01C 21/00 701/10 |
| 2007/0053513 | A1 * | 3/2007 | Hoffberg | G06K 9/00369 380/201 |
| 2007/0096945 | A1 | 5/2007 | Rasmussen et al. | |
| 2007/0288855 | A1 | 12/2007 | Rohrabaugh et al. | |
| 2008/0056531 | A1 * | 3/2008 | Zhao | 382/100 |
| 2008/0129528 | A1 * | 6/2008 | Guthrie | G09B 29/008 340/686.1 |
| 2008/0142060 | A1 * | 6/2008 | Orth | A41D 13/005 135/91 |
| 2009/0070032 | A1 | 3/2009 | Rudow et al. | |
| 2009/0119580 | A1 | 5/2009 | Rohrabaugh et al. | |
| 2009/0259969 | A1 * | 10/2009 | Pallakoff | 715/808 |
| 2010/0008586 | A1 * | 1/2010 | Meyer et al. | 382/190 |

FOREIGN PATENT DOCUMENTS

| | | |
|---|---|---|
| DE | 165686 T | 5/1998 |
| DE | 69409954 | 1/1999 |
| EP | 0699330 | 4/1998 |
| ES | 2118406 | 9/1998 |
| GB | 2278196 | 11/1994 |
| GB | 2370708 | 7/2002 |
| JP | 8510578 | 11/1996 |
| JP | 2005190470 | 7/2005 |
| WO | WO-9427268 | 11/1994 |
| WO | WO-97/07467 | 12/1997 |
| WO | WO-00/77662 | 12/2000 |
| WO | WO-2004/059251 | 7/2004 |

OTHER PUBLICATIONS

Final Office Action mailed on Sep. 8, 2010, for U.S. Appl. No. 12/271,630, 15 pages.

Non Final Office Action mailed on Aug. 3, 2011, for U.S. Appl. No. 12/271,630, 21 pages.

Final Office Action mailed on Apr. 17, 2012, for U.S. Appl. No. 12/271,630, 15 pages.

Non Final Office Action mailed on Jan. 13, 2016, for U.S. Appl. No. 12/271,630, 30 pages.

Final Office Action mailed on Jul. 28, 2016 for U.S. Appl. No. 12/271,630, 23 pages.

Notice of Allowance mailed on Aug. 31, 2016 for U.S. Appl. No. 12/271,630, 9 pages.

* cited by examiner

SYSTEMS, METHODS AND DEVICES FOR TRIP MANAGEMENT FUNCTIONS

This is a divisional application of U.S. patent application Ser. No. 10/971,354, entitled "Systems, Methods and Devices for Trip Management Functions," filed on Oct. 22, 2004 now abandoned, which application is incorporated herein by reference in its entirety.

TECHNICAL FIELD

An embodiment of the present invention relates to the field of trip planning. More specifically, embodiments of the present invention relate to systems, methods, and devices for trip management functions.

BACKGROUND

Technology for geographical locating (in which a coordinate system such as latitude/longitude is employed, and hereinafter referred to as geo-locating) provides useful benefits to a host of persons including travelers, adventurers, outdoor activity enthusiasts and other professionals in geographical information systems mapping applications, and surveying. Such technology has made available, at affordable prices, reliable geo-locating and position indicating devices such as hand-held Global Positioning System (GPS) devices such as the eTrex™ offered by the Garmin Corp. Such devices can dock with a personal computer (PC) and download therefrom a variety of data, e.g., via a serial cable, which can then be taken portably with the device. Such data can include maps, trip planning information, and the like.

Web sites have been developed which feature trip reports and information. For instance, information relating to hikes, prospecting, fishing, hunting, and recreation spots are available on line. Such information can includes pictures, sounds, text based data such as notes, reports, memoranda, memoirs, etc., and the like. Maps, terrain contours, hazards, and other information can be of interest and value to a person planning or otherwise managing a trip.

Conventionally, a person managing a trip can procure a hand-held GPS or other geo-location related device. Mapping software can be procured and loaded onto a PC. The hand-held GPS device can be connected, e.g., with a serial bus connector, to the PC and waypoints and/or other data downloaded thereto from the PC. Thus, the hand-held GPS device can be taken along on the trip loaded with valuable information relating thereto. Further, a cellular telephone can be taken along to provide communication, which can be important to trip management, or even crucial in an emergency.

During the trip, a user can access data, e.g., by first determining their geo-location, and then finding and displaying a map or other data relevant to that position. Also during the trip, the user can add information, relating for instance to points of interest, to the device. Other information, such as digital photographs, can be recorded, e.g., with a digital camera and/or a tape recorder, etc. Upon return from the trip, the waypoints can be uploaded from the GPS, the photographs from the digital camera, etc., to the PC. This information can be made available to others interested in the trip, such as by emailing a text message and/or attaching a photograph. Alternatively, the information can be posted on a service website, such as Yahoo's photo posting service (http://pg.photos.yahoo.com) or www.Ophoto.com, etc.

Such conventional trip management requires that a variety of different pieces of equipment be taken on the trip. However, this can be inconvenient, cumbersome, prone to loss, and expensive. During trip related travels, perhaps most particularly in an outdoors situation such as hiking, geo-caching, wilderness activities, etc., space, weight, and toting capacity can be at a premium. Thus, requiring multiple pieces of equipment can be burdensome. Uploading information related to trip management typically must await return therefrom, or establishing, e.g., on an ad hoc basis, a network to upload the information remotely.

SUMMARY

What is needed is a system, method, or device that reduces the equipment requirements associated with trip management functions, so as to ameliorate inconvenience, encumbrance, loss, and expense. Thus, what is needed is a system, method, or device for trip management functions that optimizes space, weight, and toting capacity, particularly in outdoors situations such as hiking, geo-caching, wilderness activities, etc. What is also needed is a system, method, or device for trip management functions that dynamically presents information to users based on their geo-location. Further, what is needed is a system, method, or device for trip management functions that readily allows remote uploading of information related to trip management.

Accordingly, systems, methods, and devices for performing a trip management function are disclosed. The system, method, and device reduces the equipment requirements associated with trip management functions, thus ameliorating inconvenience, encumbrance, loss, and expense. Thus, the system, method, and device for trip management functions optimizes space, weight, and toting capacity, particularly for outdoors situations such as hiking, geo-caching, wilderness activities, etc. The system, method, and device for trip management functions also dynamically present information to users based on their geo-location. Further, the system, method, and device for trip management functions readily allow remote uploading of information related to trip management.

In one embodiment, a client computer accesses a server networked therewith to retrieve and store data, such as Web documents, relating to the trip. A wireless device interface allows a portable device, wirelessly coupled with a cellular telephone system with the network, to download the Web document. The portable device has cellular telephone functionality, geo-locating functionality, such as GPS capability, for determining its geo-location, and a processor for processing the Web document to help manage the trip. The Web document can include a set of map tiles, which encompass a particular geo-location area, and which form a dynamic map display. As the geo-location of the device changes, the next sequential map tile is downloaded and processed for displayed thereon. Additionally, a variety of non-recreational activities can benefit from this trip planning, data collection, and reporting service. Utility or maintenance crews, or construction crews, performing installations, repairs, or upgrades to any such equipment or facility, whether in an urban location or a rural location, can benefit from use of these trip planning, guidance, and documentation collection and management tools.

DETAILED DESCRIPTION

Figure 1:
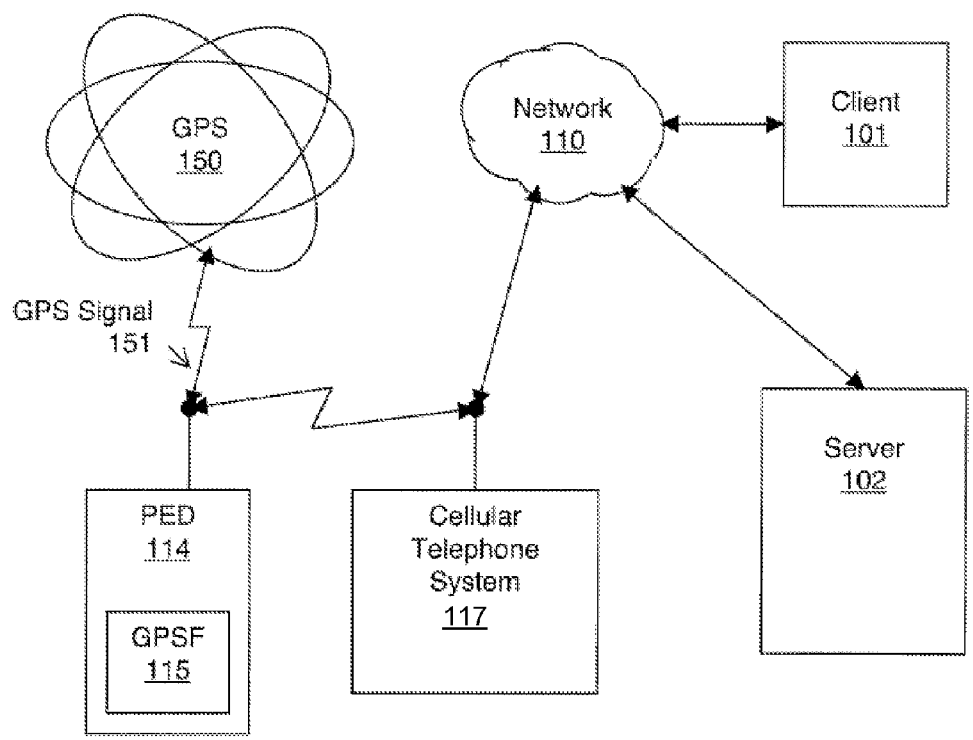
FIG. 1 depicts an exemplary network environment upon which an embodiment of the present invention can be practiced.

Systems, methods, and devices for performing a trip management function are disclosed. Reference is now made in detail to several embodiments of the invention, examples of which are illustrated in the accompanying drawing figures. While the invention will be described in conjunction with these embodiments, it will be understood that they are not intended to limit the invention to these embodiments. On the contrary, the invention is intended to cover alternatives, modifications and equivalents, which may be included within the spirit and scope of the invention as defined by the appended claims.

Furthermore, in the following detailed description of the present invention, numerous specific details are set forth in order to provide a thorough understanding of the present invention. However, one of ordinary skill in the art will realize that embodiments of the present invention may be practiced without these specific details. In other instances, well-known devices, circuits, methods, processes, procedures, systems, components, and apparatus, etc. have not been described in detail so as not to unnecessarily obscure aspects of the present invention.

Portions of the detailed description that follows are presented and discussed in terms of a process. Although steps and sequencing thereof are disclosed in figures herein (e.g., FIGS. 4, 8, 11, and 12) describing the operations of processes (e.g., process 400, 800, 1100, and 120, respectively), such steps and sequencing are exemplary. Embodiments of the present invention are well suited to performing various other steps or variations of the steps recited in the flowchart of the figure herein, and in a sequence other than that depicted and described herein. In one embodiment, such a process is carried out by processors and electrical and electronic components under the control of computer readable and computer executable instructions comprising code contained in a computer usable medium.

Embodiments of the present invention provide a system, method, and device for performing a trip management function. In one embodiment, a client computer accesses a server networked therewith to retrieve and store data, such as Web documents, relating to the trip. A wireless device interface allows a portable device, wirelessly coupled with a cellular telephone system with the network, to download the Web document. The portable device has cellular telephone functionality, geo-locating functionality, such as GPS, Galileo™, or any other Global Navigation Satellite Service (GNSS) capability, for determining its geo-location, and a processor for processing the Web document to help manage the trip. The Web document can include a set of map tiles, which encompass a particular geo-location area, and which form a dynamic map display. As the geolocation of the device changes, the next sequential map tile is downloaded and processed for displayed thereon.

Therefore, a system, method, and device for performing a trip management function are provided wherein the number, variety, etc. of different pieces of equipment to be taken on a trip for performing trip management functions is effectively reduced. Advantageously, this promotes user convenience and ease. This can be especially advantageous in an outdoors situation such as hiking, geo-caching, wilderness activities, etc., where space, weight, and toting capacity are typically at a premium. Loss and expense associated with conventional trip management functions are also thus reduced. Further, uploading information related to trip management can readily be performed remotely, e.g., from the field.

Exemplary Network Environment

FIG. 1 depicts an exemplary network environment 100 upon which an embodiment of the present invention can be practiced. In network 100, a client computer 101 is coupled with a server computer 102 with (e.g., via) network 110. Network 110 can comprise the Internet, a wide area network (WAN), and/or a combination of the Internet and one or more WANs. A portable electronic device 114, such as a cellular telephone (e.g., having cellular telephone functionality), can couple with network 110, server computer 102, etc. with cellular telephone system 117, e.g., wirelessly.

In one embodiment, portable device 114 functions to determine its geographic location, for instance, by accessing signals 151 to determine that location The geo-location source signals are generated by a position-determination system and are available to the portable device 114 via radio transmissions. A position fix is determined by a suitable position determination receiver in response to a location related query by portable device 114. The position determination receiver may be configured to receive signals from Global Navigation Satellite System (GNSS) satellites, such as GPS, or Galileo™, or from other terrestrially-based position determination sources. Additionally, improved position fix accuracy can be obtained by the incorporation of another receiver configured to receive differential correction signals from such sources as the Coast Guard DGPS network, the Wide Area Augmentation System (WAAS), other such satellite based correction systems, and other such terrestrial correction systems. These signals are transmitted at a variety of different frequency bands and require a specialized receiver for each band. Such receivers are now commonplace in the market, particularly for commercial applications, and as such are a well-known option in GPS receiver supply.

In one embodiment, portable device 114 accesses the geo-location related signal 151 from the Global Positioning System (GPS, e.g., a collection, of satellites, launched and managed by the U.S. Air Force, for broadcast distribution of radio signals containing information from which position on earth can be determined), hereinafter referred to as a GPS system, or "GPS." Similar position determination signals will be available from the Galileo satellite system in the near future. In the present embodiment, portable device 114 has a geo-locating functionality 115, operable with its cellular telephone functionality, for accessing geo-location related signal group 151 and determining portable device's geo-location, e.g., geographic position, therewith. Geo-locating functionality 115, in the present implementation, comprises a GPS functionality (GPSF), which exemplifies the functionality 115 herein. Geo-location determining and reporting (e.g., GPS) system 150 determines the geographic position of the portable device 114, such that the user can access locational information with the device 114, e.g., with its GPS functionality. (It is appreciated that device 114 may, in practice, utilize separate antennae to access cellular telephone and GPS signals.) Such capability is widely available in cellular phones, mainly due to the requirement by the U.S. Federal Communications Commission that calls made by cellular phones to E-911 service centers include position information, to facilitate a timely response to such emergency calls by including a position fix of the caller. To date, the satellite-based position fix is derived in conjunction with satellite data provided via a data link from the E-911 service center, sent to the cellphone when the E-911 call is established; but the GPS receivers included in the cellphones can also determine their position autonomously, given sufficient time (non-emergency situations) to acquire and track the satellites. Therefore the GPS receivers can be used for such applications as are described in this application, as well as for the E-911 service requirement.

While the present embodiment is described with reference to GPS as comprising the geo-location determining and reporting system 150, it should be appreciated that an alternative embodiment may be practiced where the geolocation determining and reporting system 150 is a system other than GPS. In such an embodiment, geo-locating functionality 115 is capable of accessing that system. In one embodiment, geo-locating functionality 115 comprises a GPS functionality capable of accessing one or more geo-location systems, in addition to its GPS access capability, such as the Galileo system, or such as the digital television-based positioning system described in U.S. Pat. Nos. 6,806,830, 6,753,812, 6,727,847, 6,717,547, 6,559,800, and 6,522,297 issued to the Rosum Corp. and incorporated by reference herein. This system substantially relies on triangulation position determination using multiple television transmitters.

In one embodiment, GPS (e.g., or other geo-location functionality) 115 is programmed into portable device 114, e.g., as software stored in flash or other memory, storage, etc. and/or suitable hardware and firmware available from Trimble Navigation Ltd., a corporation in Sunnyvale, California. In one embodiment, GPSF 115 allows the geographic position of the portable device 114 to be precisely and accurately determined.

In one embodiment, portable device 114 functions to run an application, e.g., with a processing functionality operable with its communication functionality. This application relates to performing a process (e.g., a method implemented on portable device 114 with its processor) for wirelessly accessing server 102 with (e.g., via, using, etc.) cellular telephone system 117, accessing data relating to a trip with (e.g., via, using, etc.) server 102, and downloading the trip related data such as Web pages, maps, etc. therefrom to portable device 114.

Thus, portable device 114 can be used for management functions (e.g., managing, planning, journaling, mapping, documenting, etc.) related to the trip. Further, in one embodiment, portable device 114 has functionality to capture information such as images (e.g., graphics files) and/or sounds (e.g., audio files) relating to its geo-location and send the information to server 102, which can store it, e.g., with the data relating to the trip, etc. In one embodiment, portable device 114 is deployed associated with (e.g., mounted on, in, etc.) a vehicle.

Exemplary Network Infrastructure

Figure 2:
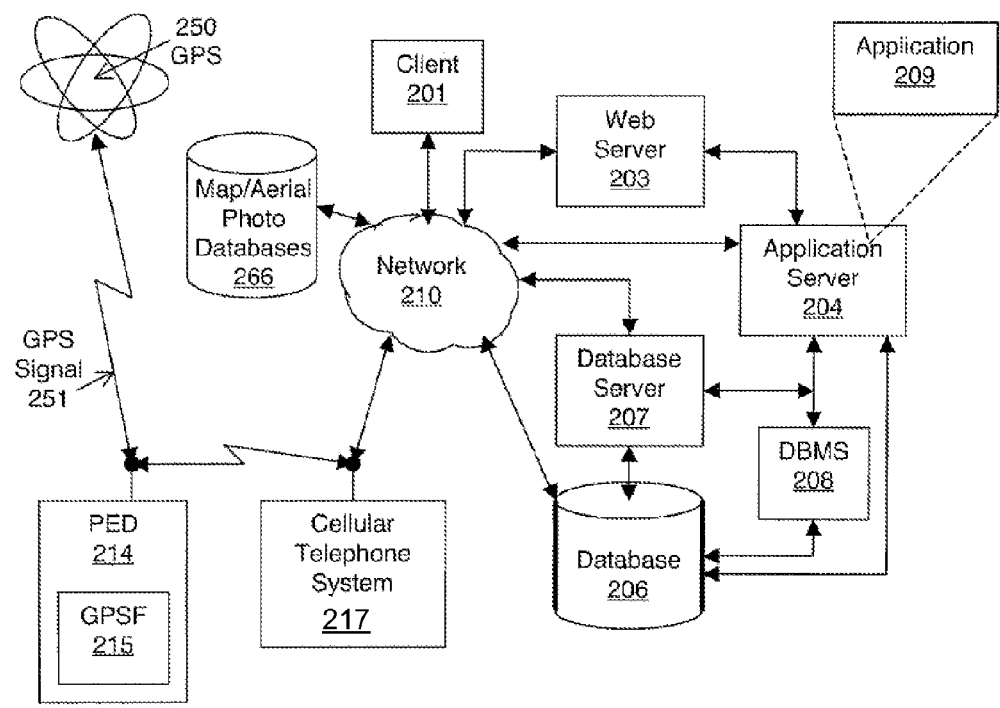
FIG. 2 depicts an exemplary network based infrastructure upon which an embodiment of the present invention can be practiced.

FIG. 2 depicts an exemplary network based infrastructure 200, upon which an embodiment of the present invention can be practiced. Network based infrastructure 200 can be based on any capable network. In one embodiment, infrastructure 200 comprises a Web based environment in which network 210 comprises, e.g., one or more WANs, an intranet, the Internet, etc.

Client computer 101 accesses another component of infrastructure 200 via network 210. There is no particular limit to the number of client computers supportable by infrastructure 200 relevant to the discussion of the present invention. In one embodiment, each client computer 101 is authorized to access infrastructure 200. Infrastructure 200 has a Web server 203, which has access to network 210, an application server 204, and a database server 207.

The Web environment of infrastructure 200 can be UNIX based, Windows based, or based on another system and can be Java capable. In the exemplary embodiments discussed herein, infrastructure 200 has a Java based Web environment. The Web environment can provide to infrastructure 200 features including load balancing, failover, and built-in redundancy.

One exemplary implementation of infrastructure 200 provides a Java based Web environment wherein Web server 203 depicts one or more Web servers such as the Apache™ or a similar server. Application server 204 depicts one or more application servers such as the Borland™ Enterprise Server or similar application servers. Database server 207 depicts one or more database servers such as the Oracle™ or similar database server. Where multiple application servers are depicted by application server 204 (and/or e.g., multiple Web servers by Web server 203), in one embodiment each application server 204 links to the various Web servers 203 for providing load balancing and other fault tolerance for high volume traffic (e.g., failover, built-in redundancy, etc.).

Applications running in the Web environment 200 of this implementation, e.g., with application server 204, are substantially compliant with the with the Java 2 Platform, Micro Edition™ (J2ME) and use a K Virtual Machine (KVM) and/or with the Java 2 Platform, Enterprise Edition™ (J2EE) and run in their own Java Virtual Machine (JVM). It should be appreciated that the Web environment of infrastructure 200 can be implemented with various other configurations, features, and/or components, etc.

In one embodiment, application server 204 accesses network 210 via Web server 203. Alternatively, application server 204 has direct access to network 210. In one embodiment, application server 204 accesses a database 206 via database server 107, using a database management system (DBMS) 208. Application server 204 processes information for client computer 201 and portable device (e.g., cell phone) 214, etc. and provides processing required to provide these computers with current information. In one embodiment, application server 204 performs business logic, which functions with DBMS 208.

In one implementation, Common Gateway Interface (CGI) and/or other scripts are supported and processing is performed with Enterprise JavaBeans (EJB), Java Server Pages (JSP), and/or Java servlets. Another linkage modality between the content of, e.g., database 206 and particular Hypertext markup Language (HTML) and Wireless Markup Language (WML) documents (e.g., Web pages, etc.) can be supported with the CGI and/or other scripts.

In one exemplary implementation of infrastructure 200, database 206 depicts one or more databases. Database server 207 includes DBMS 108 and accesses database 206 for storing and retrieval of information therein. DBMS 208 controls organization, storage, retrieval, security, and integrity of the information in database 206. In one embodiment, database server 207 accesses map and aerial/space (e.g., satellite, etc.) photograph (photo) database 266 for retrieval of information therein.

In one embodiment, map and aerial/space photo database 266 comprise two or more individual databases. In an alternate embodiment, map and aerial/space photo database 266 is accessed with network 210 without database server 207, e.g., with a database server otherwise independent of network environment 200.

Web server 203 provides Web functionality within infrastructure 200 with its hardware and operating system (OS), with software, with Transfer Control Protocol/Internet Protocol (TCP/IP), Wireless Transfer Protocol (WTP), and/or Wireless Application Protocol (WAP) and content such as Web pages and other documents, e.g., rendered in HTML, WML, etc. Where infrastructure 200 comprises an internal, enterprise based and/or subscription based network infrastructure, network 210 comprises an intranet and Web server 203 functions as an intranet server.

Web server 203 handles information requests in, e.g., Hypertext Transfer Protocol (HTTP), WAP, WTP, etc. and responds with appropriate HTML, WML, etc. documents. Web server 203 also executes, e.g., CGI and other scripts, JSPs, and Active Server Pages (ASP), etc. In one exemplary implementation, Web server 203 comprises a separate HTTP server, WTP server, and/or File Transfer Protocol (FTP) server, etc. In another, Web server 203 provides all such functionality in a single entity.

In one embodiment, application server 204 provides middleware functionality to enable a browser based application running, e.g., with client computer 201 and/or cell phone 214 to access various information sources. Application server 204 supports a suite 209 of network based applications, which in one embodiment can be Web based. Network based applications of suite 209 is downloaded, e.g., at client computer 201 and/or cell phone 214 from application server 207 via network 210 with Web server 203, at run time.

In one embodiment, portable device 214 functions to determine its geographic location, e.g., accesses a signal 251 relating to that location. The geo-location related signal 251 is generated by a geographic location determining and reporting system 250 in response to a location related query by portable device 214 and comprises data corresponding to the location of the portable device 214. In one embodiment, geographic location determining and reporting system 250 comprises the GPS discussed above. In another embodiment, a geographic location determining and reporting system other than or in addition to the GPS are used. However, geo-location determining/reporting system 250 is exemplified by the GPS and is referred to herein as GPS 250; this is illustrative and is not intended to be limiting.

In the present implementation, portable device 214 has a GPS and/or other geo-locating functionality 215, operable with its cellular telephone functionality, for accessing geo-location related signal 251 and determining portable device's geo-location, e.g., geographic position, therewith. GPS functionality (GPSF) 215 accesses GPS signal 251 to determine the geographic position of the portable device 214. It should be appreciated that device 214 may, in practice, utilize separate antennae to access cellular telephone and GPS signals.

While the present embodiment is described with reference to GPS as comprising the geo-location determining and reporting system 250, it should be appreciated that an alternative embodiment may be practiced where the geo-location determining and reporting system 250 is a system other than GPS. In such an embodiment, geo-locating functionality 215 is capable of accessing that system. In one embodiment, geo-locating functionality 215 comprises a GPS functionality capable of accessing one or more geo-location systems, in addition to its GPS access capability.

In one embodiment, GPS (e.g., or other geo-location functionality) 215 is programmed into portable device 214, e.g., as software stored in flash or other memory, storage, etc. and/or hardware, firmware, etc. available from Trimble Navigation Ltd. GPSF 215 allows the geographic position of the portable device 214 to be precisely and accurately determined. The absolute position accuracy available from GNSS/GPS systems is typically 4-7 meters. Better accuracy is available with a variety of corrections systems well-known in the arts.

In one embodiment, portable device 214 functions to run an application, e.g., with a processing functionality operable with its communication functionality. This application relates to performing a process (e.g., a method implemented on portable device 214 with its processor) for wirelessly accessing Web server 203 (e.g., and/or application server 204, database server 206, etc.) with (e.g., via, using, etc.) cellular telephone system 217, accessing data relating to a trip with (e.g., via, using, etc.)

those servers, and downloading the trip related data such as Web pages, maps, etc. therefrom to portable device 214.

Thus, portable device 214 can be used for management functions (e.g., managing, planning, journaling, mapping, documenting, etc.) related to the trip. Further, in one embodiment, portable device 214 has functionality to capture information such as images (e.g., graphics files) and/or sounds (e.g., audio files) relating to its geo-location and send the information to servers 203, 207, etc., which can store it, e.g., with the data relating to the trip, etc., in database 206.

Exemplary Portable Device

Figure 3A:
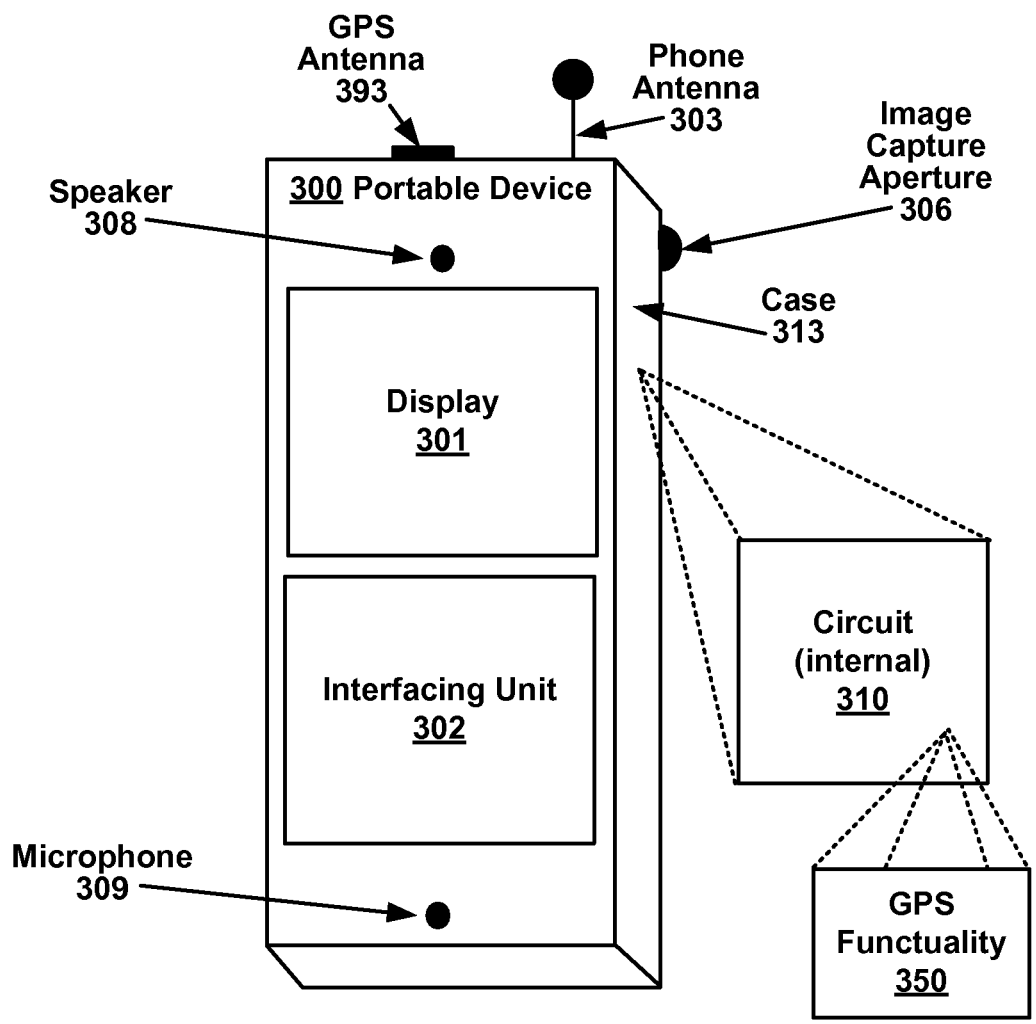
FIG. 3A depicts a portable device, according to an embodiment of the present invention.

FIG. 3A depicts a portable device 300, according to an embodiment of the present invention. Portable device 300 can exemplify portable devices 114, 214 discussed above (FIG. 1, 2, respectively). Portable device 300 comprises, in various implementations, a cellular telephone, a GPS device that incorporates cellular telephone functionality, a portable digital assistant (PDA) or e.g., another small form factor computing device (e.g., computer) such as a palmtop computer, a handheld computer, pocket computer, etc., or another portable computer such as a laptop, wherein the PDA and/or other computers have cellular telephone and/or other communications and/or networking functionality. Portable device 300 is housed in a sturdy case 313 made of a protective material such as plastic, etc.

Portable device 300 has a display 301 for displaying information to a user. Display 301 comprises a liquid crystal display (LCD), cold cathode (e.g., thin) or other cathode ray tube (CRT) device, etc. and displays images (e.g., comprising pixels, etc.) and can achieve high resolution, chrominance, luminance, etc., and in some implementations may be reflective, backlit, etc. In one implementation, display 301 comprises a lightweight, low power consumption, etc. display device.

Portable device 300 has an interface unit 302 for allowing a user to interface therewith, e.g., for operational, data entry, etc. functions. Interface unit 302 comprises, in one implementation, an alphanumeric input device such as a telephone keyboard, a small form factor QWERTY' or other keyboard, an electromechanically actuated notepad device, buttons, knobs, switches etc. In one implementation, interface unit 302 operates with display 301 to allow graphical user interface (GUI) functionality, e.g., with interactive windows, fields, screen 'buttons', icons, etc. displayed thereon.

Component circuitry 310 within case 313 provides functionality for portable device 300. An antenna 303 (e.g., coupled with internal circuit 310), which can be retractable (e.g., into the inside of case 313) allows portable device 300 to function wirelessly, e.g., for communicating with a network. An antenna 393 allows device 300 to access signals from the GPS or another geo-locating system, etc. (e.g., networks 110, 210 and GPS 150, 250; FIG. 1, 2). Graphical data relating to trip management such as photographs, aerial and/or space photographs, maps, map tiles, etc., like other information, are displayed to the user on display 301, which is controlled with circuit 310. In one embodiment, circuit 310 comprises GPS and/or other geo-locating functionality, which in one embodiment is software based and programmed into components of circuit 310.

Factors contributing to the utility of portable device 300 include portability, anytime usefulness in all manner of places in almost any conceivable circumstance, and more recently, versatility with various applications, including geo-locating functionality 350. In one embodiment, the geo-locating and trip management functionality of portable device 300 is provided with a modular system, which can be implemented in software, hardware, firmware and/or any combination of same. Such software comprises, in one embodiment, a computer readable medium having encoded therein (e.g., thereon, etc.) a code for causing a computer system to perform a method for a trip management function. Modules comprising the system for a trip management functionality can include components of circuit 310, programmed configurations of such components, and/or code stored with such components.

Exemplary Circuit

Figure 3B:
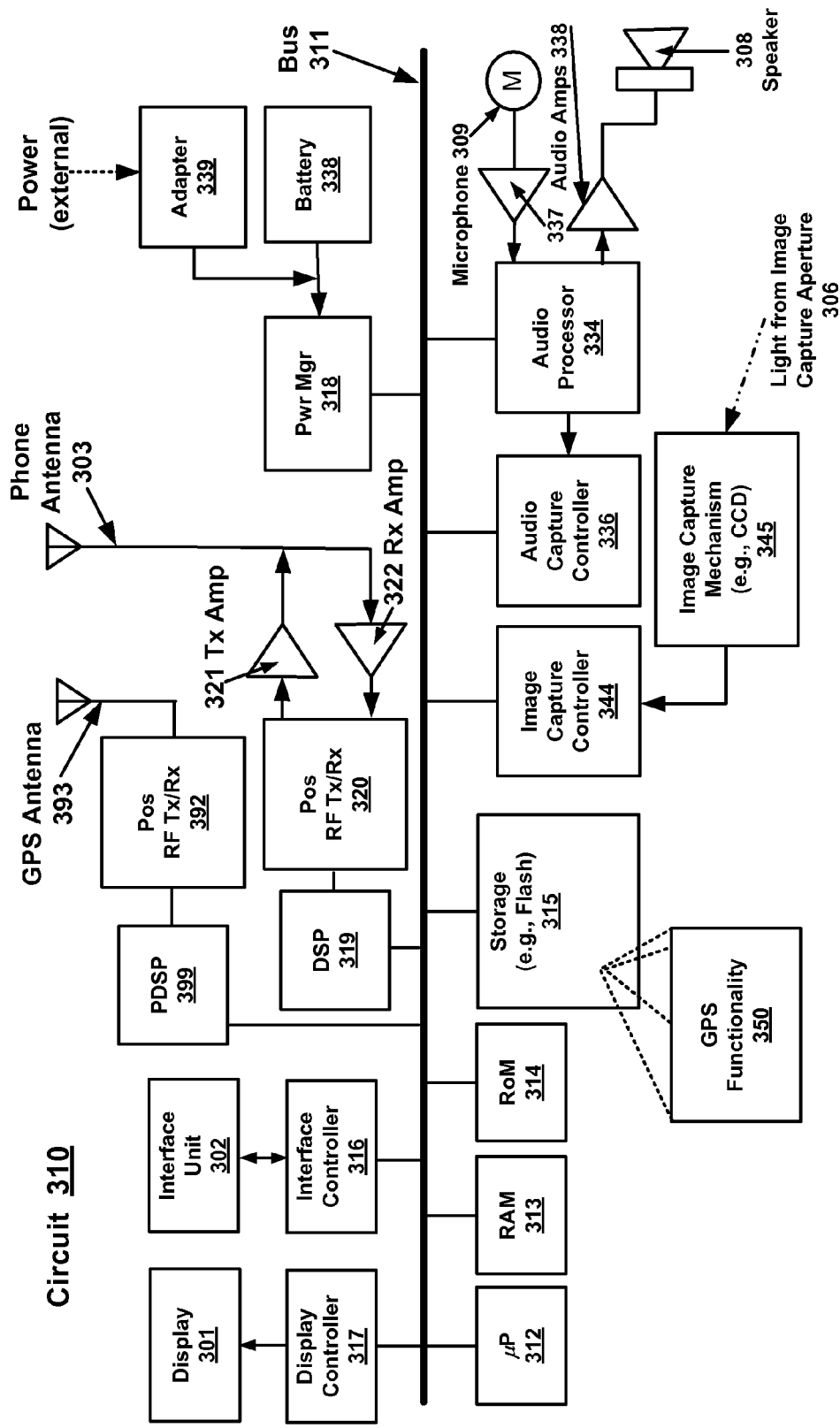
FIG. 3B depicts an exemplary circuit, according to an embodiment of the present invention.

FIG. 3B depicts an exemplary circuit 310, according to an embodiment of the present invention. Circuit 310 provides a variety of functionality to portable electronic device 300 (FIG. 3A), which performs a communication function. A processor (e.g., a microprocessor) 312 operates, in one embodiment, with a digital signal processor (DSP) 319 and a radio frequency (RF) transceiver (Tx/Rx) 320, which provide the communications functionality. Processor 312 further operates with positioning DSP 399 and positioning RF Tx/Rx 392, which provide positioning functionality.

RF Tx/Rx 320 is coupled to antenna 303 with a pair of amplifiers 321 and 322. Transmission amplifier 321 amplifies an output of RF Tx/Rx 320 to propagate an RF signal with the antenna 303. Receiving amplifier 322 amplifies signals such as cellular telephone signals accessed with antenna 303 to provide an amplified input corresponding thereto to transceiver 320. Positioning RF Tx/Rx 392 is coupled to GPS antenna 393 for accessing a GPS signal (e.g., GPS signal 251; FIG. 2). (It should be appreciated that a pair, or another configuration, of RF amplifiers (not shown) similar to amplifiers 321 and 322, but designed and configured to operate at the frequencies corresponding to GPS type signals, can intercouple the positioning RF Tx/Rx 392 to GPS antenna 393. Transmission amplifier 321 amplifies an output of RF Tx/Rx 320 to propagate an RF signal with the antenna 303. Receiving amplifier 322 amplifies signals such as cellular telephone signals accessed with antenna 303 to provide an amplified input corresponding thereto to transceiver 320.

Thus, circuit 310 allows portable electronic device 314 (FIG. 3) to couple with a cellular telephone system, a GPS and/or another geo-locating determination and reporting system.

Battery 338 provides power to circuit 310 with power manager 318, which functions with microprocessor 312 to manage power consumption, conservation, protection, etc. for portable device 314. An adapter 339 allows power to be drawn from an external source for circuit 314 and, with power manager 318, allows battery 338 to be charged, recharged, etc.

Display controller 317 operates with microprocessor 312 to control display 301 and e.g., data displayed thereon. Interface controller 316 operates with microprocessor 312 to control interface 302, with which a user can interface with the computer effectively comprised by circuit 310.

Random access memory (RAM) 313 functions with microprocessor 312 to provide a memory workspace for computing processes carried out with microprocessor 312. A read-only memory (ROM) 314 handles basic input/output system (BIOS) functions with microprocessor 312 and provides pre-programmed boot and/or other code to the microprocessor 312.

Storage medium 315 comprises, in one exemplary implementation, a Flash memory structure for storing programming code such as relate to communications, networking, computing, and/or geo-location functionality for use with microprocessor 312, as well as data stored by a user of portable device 14, such as graphical and audio data, such as those relating to a trip being managed using portable device 314. In one embodiment, geo-locating functionality programmed into storage (e.g., flash) 315 comprises GPS functionality 350. In one embodiment, GPS functionality 350 functions with another geo-location system; e.g., in addition to or instead of the GPS.

In one embodiment, processor 312 functions, e.g., with the communications functionality of circuit 315, for running an application relating to performing a process for managing a trip.

In one embodiment, an image capture mechanism 345 such as a charged coupled device (CCD) imager 345 accesses light admitted with image capture aperture 306 (FIG. 3) of the portable device 314 and converts the light into corresponding electrical signals which are processed with image capture controller for storage in flash medium 315 and/or further processing with processor 312.

In one embodiment, an audio processor 334 receives an input from microphone 309, amplified with audio amplifier 337. In one embodiment, audio processor 334 provides an output to speaker 308, which is amplified with audio amplifier 338.

Exemplary Process for Trip Management

Figure 4:
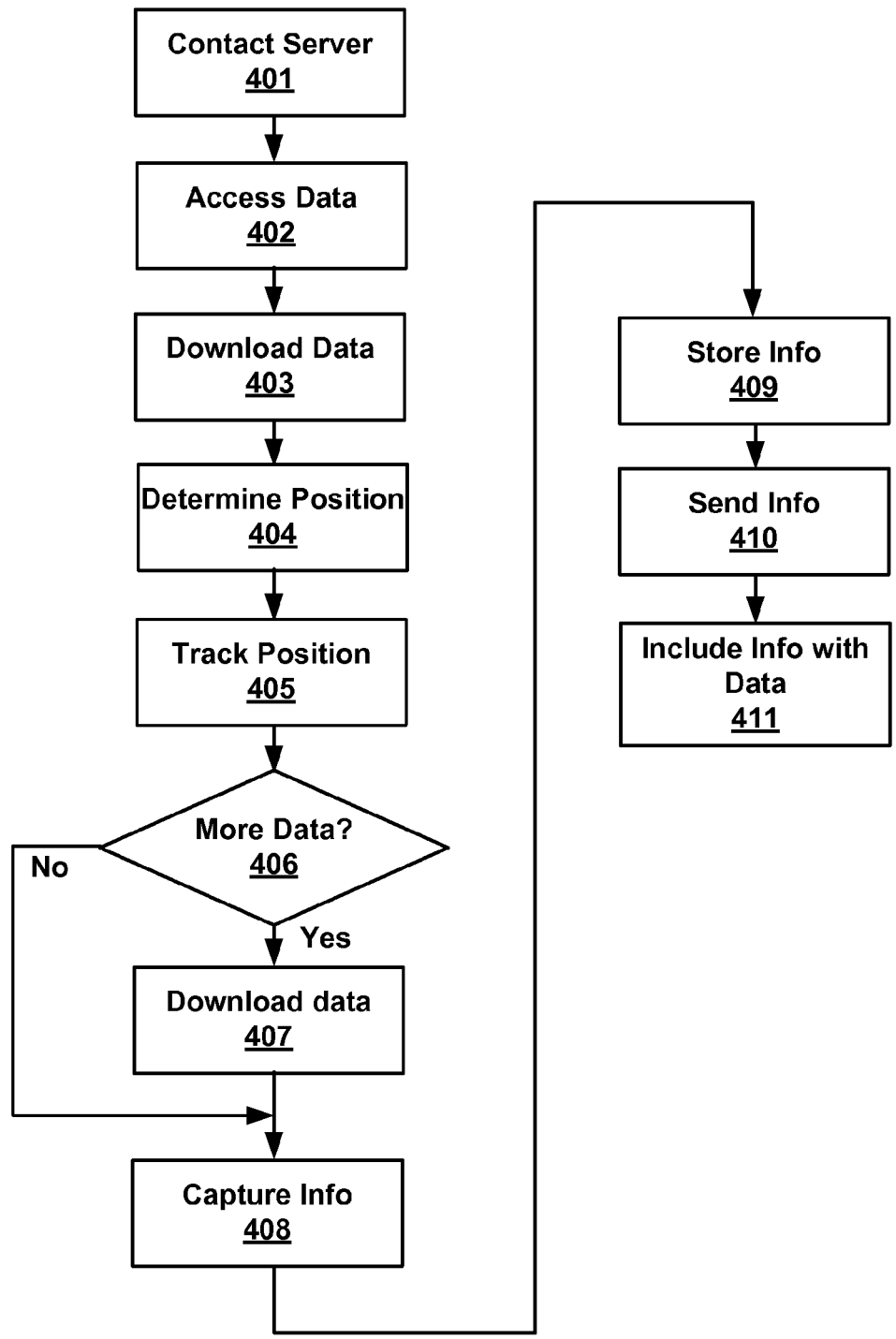
FIG. 4 is a flowchart of a computer implemented process for managing a trip, according to an embodiment of the present invention.

FIG. 4 is a flowchart of a computer implemented process 400 for managing a trip, according to an embodiment of the present invention. Process 400 begins with step 401, wherein portable device 300 wirelessly contacts a server with a cellular telephone system (e.g., server 203, cellular telephone system 217; FIG. 2).

Figure 5:
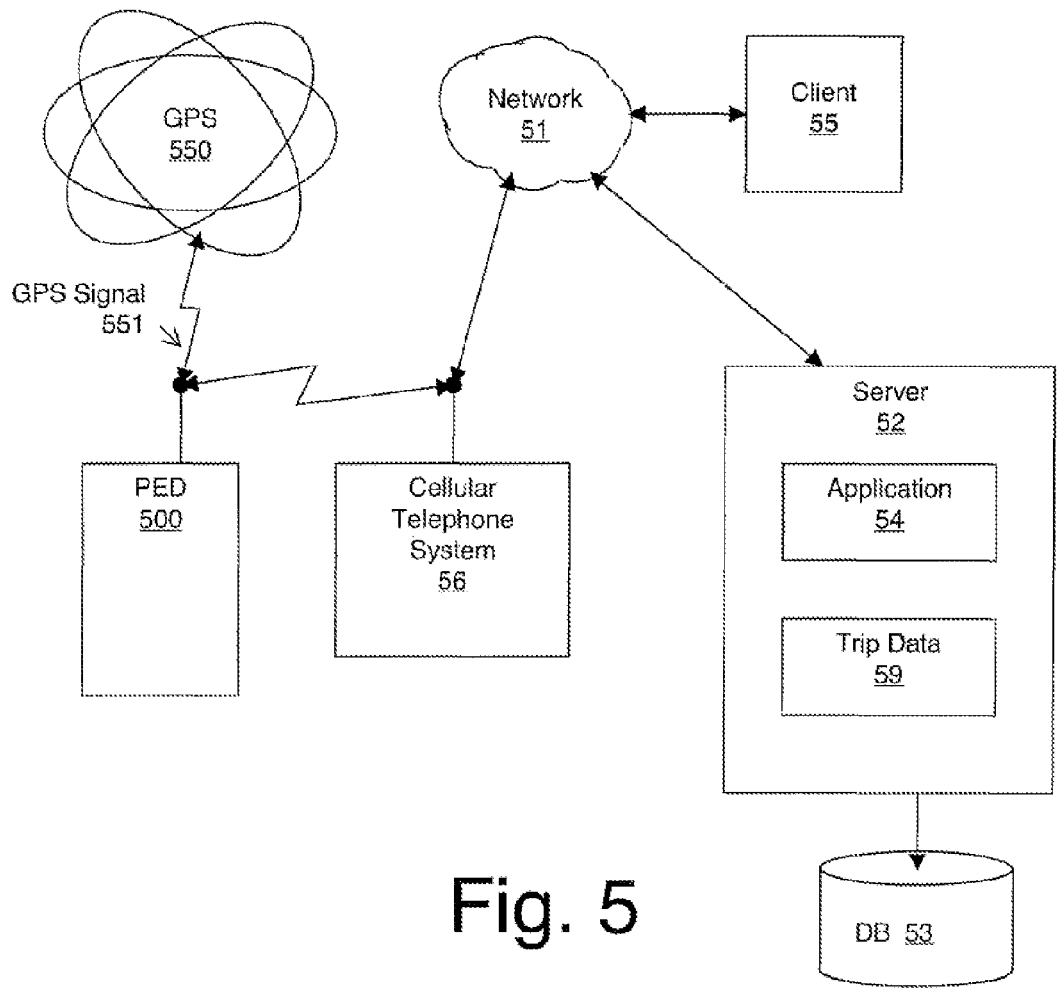
FIG. 5 depicts an exemplary network based computerized system, according to an embodiment of the present invention.

In step 402, data relating to the trip is accessed with the server. In step 403, the data so accessed, which is useful for managing the trip, is downloaded from the server to the portable electronic device (PED). In step 404, the portable electronic device determines its geo-location, such as with respect to a related GPS signal 551 (FIG. 5). In step 405, the position of the PED, which may be changing, e.g., with movement, is tracked, e.g., with the GPS 550. In step 406, it is determined whether more data, e.g., a sequential map tile, is to be downloaded to the PED. If so, in step 407, that data is downloaded.

If not, process 400 continues with step 408, wherein information relating to the geo-location of the device, such as a photograph (e.g., a JPEG, MPEG, etc. file) and/or a sound and/or other audio information (e.g., a MIDI file), text based data such as notes, etc., is/are captured, e.g., at that geo-location.

In optional step 409, upon a user inputting the information to the portable device, that information is stored thereon. In optional step 410, upon a user acting to send this information, it is wirelessly sent to the server with the cellular telephone system. In optional step 411, the server includes the information sent to it with the data relating to the trip, completing process 400.

Exemplary System

FIG. 5 depicts an exemplary network based computerized system 50, according to an embodiment of the present invention. In one embodiment, network based system 50 comprises components of a network environment and/or infrastructure such as discussed above (e.g., FIG. 1, 2). Network based system 50 has a network 51, which can comprise the Internet, a WAN, etc.

A server 52 coupled with network 51 runs a network based application 54, which allows a user of a client computer 55 to store, with server 52, data relating to a trip (e.g., trip data) 59. Server 52 can store data 59 in database 53. A cellular telephone system (CTS) 56, coupled with the network 51. A portable electronic device (PED) 500 is disposed to wirelessly communicate with CTS 56.

Thus, the PED 500 accesses server 52 and downloads therefrom trip data 59, which can be maps comprised of map tiles, retrieved for instance from a map database such as that associated with the United States Coast and Geodetic Survey (USGS). PED 500 wirelessly accesses a signal 551 relating to its position, which is transmitted by a GPS (e.g., and/or another geo-location determining and reporting system). In one embodiment, map tiles are sequentially downloaded to the PED 500 to correspond with a change in its geo-location.

In one embodiment, system 50 exemplifies a mission planning tool comprising a first application running on a client computer and performing a first process and a second application running on a portable computer for performing a second process. The first process comprises accessing a server networked with the client computer and placing information relating to the mission on the server.

Missions supportable by the mission planning tool include outdoor recreation and travel, construction, exploring, surveying, mapping, civil and/or military operations, logistics, geo-caching, mining, rescues, utility work including construction and maintenance of wirelines, pipelines, antennae, substations, and/or other remote, isolated, wilderness, etc. facilities, and myriad related similar, and/or comparable activities, endeavors, and/or enterprises.

The second process comprises accessing the server remotely with a communication system, retrieving a first portion of the information according to a first location of the portable computer and displaying that first portion therewith. As the portable computer moves to a second location, the second process further comprises retrieving a second portion of the trip information according to the second location and displaying that second portion therewith.

The portable computer can function to gather data relating to the mission remotely between the first and second locations, inclusive. Upon it doing so, the second process further comprises sending the data to the server with (e.g., via) the communication system. The server stores the data, e.g., with and/or associated with the trip information.

Exemplary Map

Figure 6:
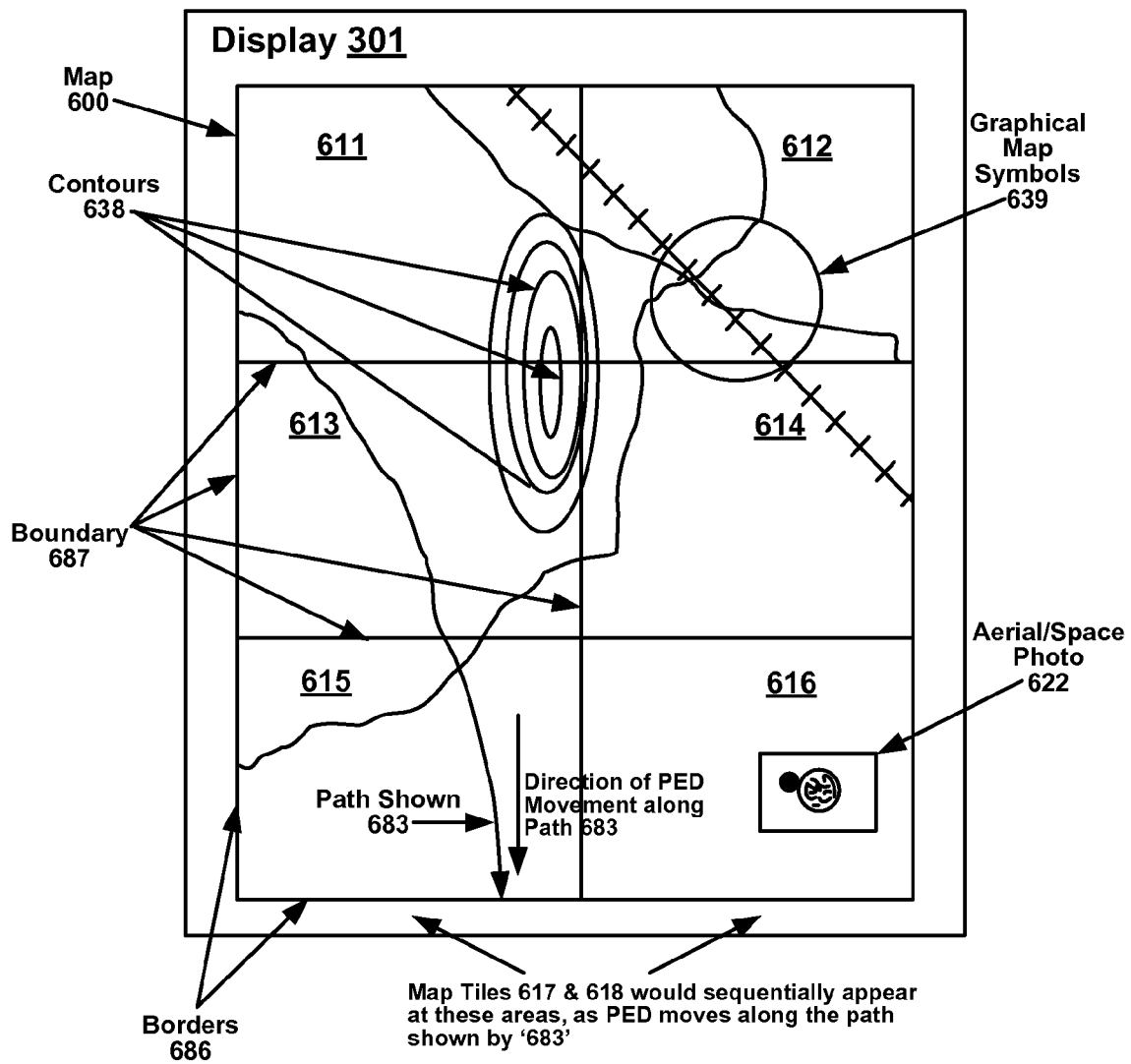
FIG. 6 depicts an exemplary map, according to an embodiment of the present invention.

FIG. 6 depicts an exemplary map 610 (e.g., a map window), presented with display 301. Map 610 comprises map tiles 611-616, each having borders that comprise a boundary 687 of that map tile corresponding to a substantially linear contour of a geographical area circumscribed (e.g., encompassed, etc.) with its borders. In one embodiment, map 610 comprises a dynamic display.

For instance, as the PED moves, changing its geo-location, it is tracked by the GPS on a path, course, etc. 683. Users can annotate information along path 683, which correlates to the PED's geo-location. Further, as path 683 reaches border 686 of map tile 615, the next sequential map tile (and e.g., its compliment) after map tile(s) 615 (and e.g., 616) are automatically downloaded from the server and displayed.

In one embodiment, map 600 displays relevant, corresponding, etc. topographic information, such as with contour lines 638, graphical map related symbols, icons, etc. 639, and/or aerial/space/etc. photographic imagery 622 associated with or corresponding to, etc., a particular geo-location or geolocation nexus.

Exemplary System

Figure 7:
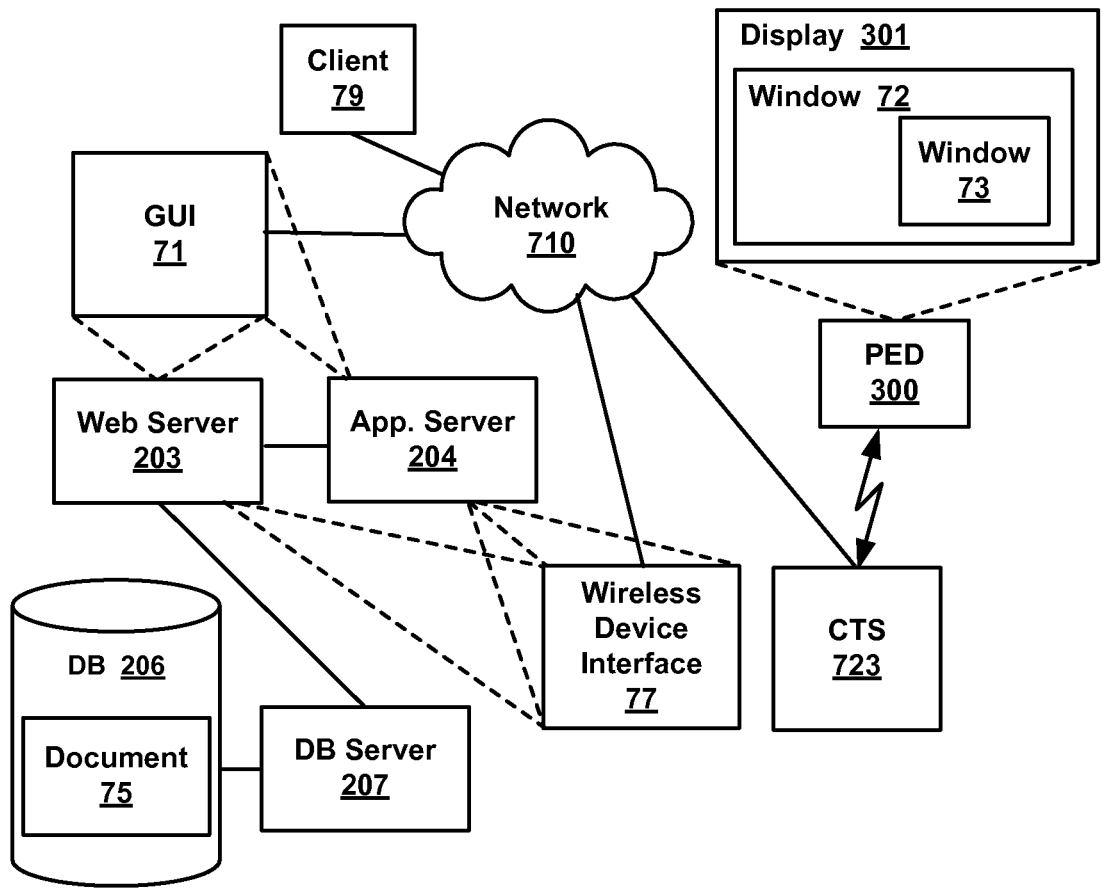
FIG. 7 depicts an exemplary Web-based, computerized application system, according to an embodiment of the present invention.

FIG. 7 depicts an exemplary Web-based, computerized application system 70, according to an embodiment of the present invention. Components of system 70 can comprise hardware, software, firmware, and/or combinations thereof. System 70 has a GUI 71, which allows a user of client computer 79 to store data, such as a Web document 75, with servers 203, 204, and/or 207, e.g., in database 206. GUI 71 further allows a user of a PED (e.g., PED 300; FIG. 3A) to interactively view and handle data on display 301 with (e.g., via, etc.) network 710 and CTS 723 with one or more interactive windows 72 (and 73) shown thereon.

In one embodiment, GUI 71 comprises a plurality of GUIs. A wireless device interface, operating with GUI 71, allows the PED, wirelessly couples with CTS 723, to accesses Web document 75. The PED is configured, in one embodiment, as discussed above (e.g., FIG. 3A, 3B).

Exemplary Process for Trip Management

Figure 8:
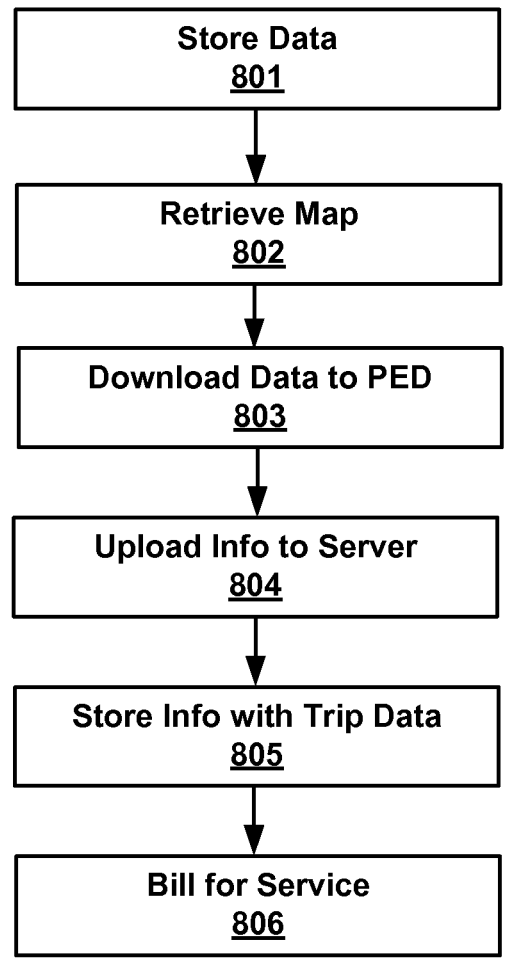
FIG. 8 is a flowchart of the steps in an exemplary computer implemented process for managing a trip, according to an embodiment of the present invention.

FIG. 8 is a flowchart of the steps in an exemplary computer implemented process 800 for managing a trip, according to an embodiment of the present invention. Process 800 begins with step 801, wherein data such as a Web page relating to the trip is stored with a server coupled with a network to a client computer, e.g., by a user thereof.

In step 802, a map, which can comprise a sequence of map tiles corresponding to progressively related (e.g., with, via, travel, movement etc.), is retrieved, for instance from a map server. The maps can comprise the Web document.

In step 803, the Web document, map tiles, and/or other data is/are downloaded to a portable device (PED) upon access therewith to the server. In step 804, the PED determines its geo-location, geographic position, etc., e.g., with reference to a GPS signal.

In step 805, information relating to the geo-location (and e.g., correlated therewith) is stored on the PED. In step 806, the information is uploaded from the PED to the server. In step 807, the information is stored with the server, e.g., in a database, with the trip related data. It is accessible there to authorized users.

In step 808, a user is billed for accessing, storing, etc. the data, information, etc. relating to the trip. The billing can be on the basis of a subscription for continuing or other services, a pay per use basis, and/or a promotional basis, etc.

Exemplary Data Flow

Figure 9:
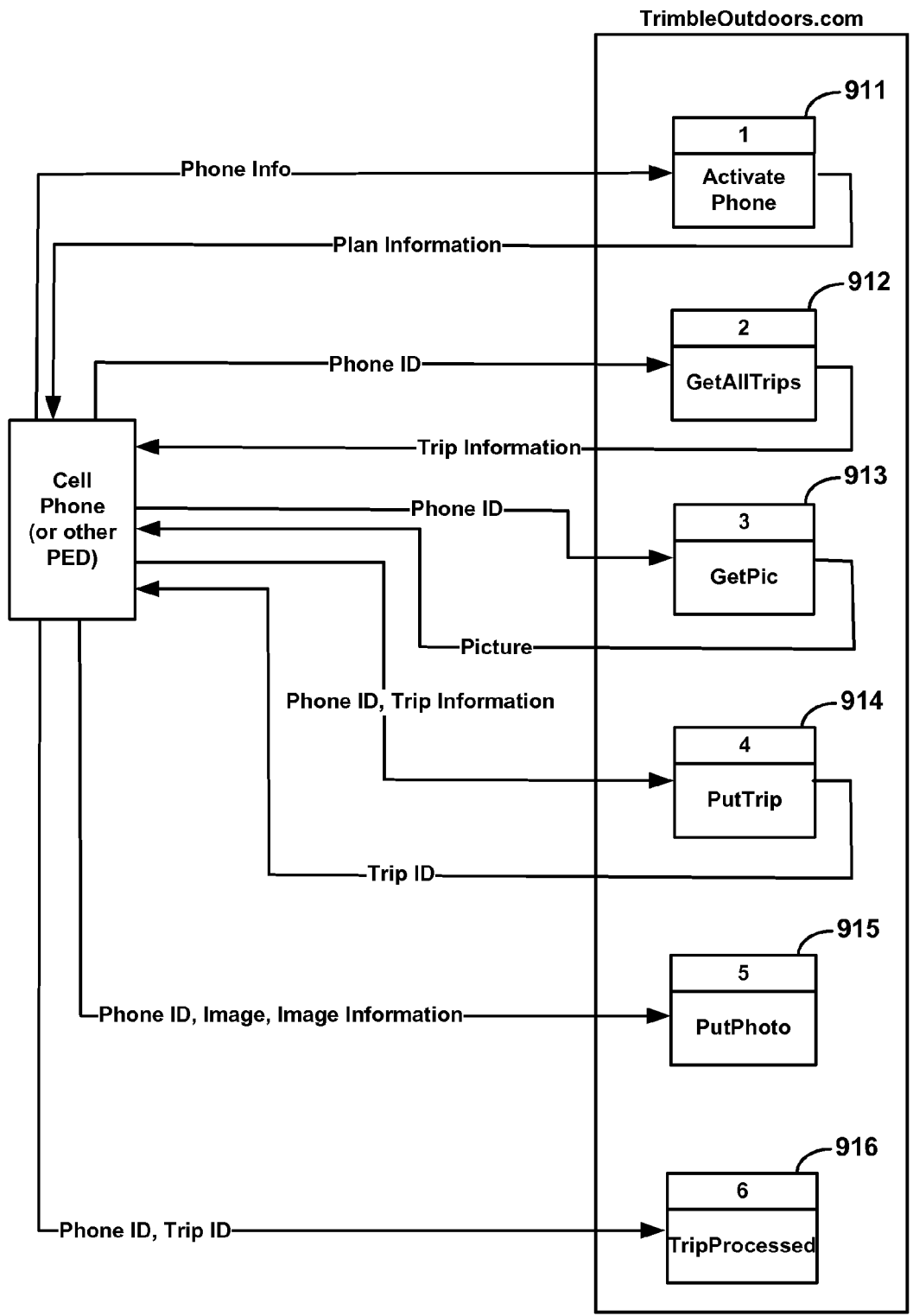
FIG. 9 depicts exemplary data flow between a server and a portable electronic device, according to an embodiment of the present invention.

FIG. 9 depicts exemplary data flow 900 between a server 902 and a PED 901, according to an embodiment of the present invention. Data flow 900 corresponds to action of functionality 911-916, as discussed above.

Figure 10:
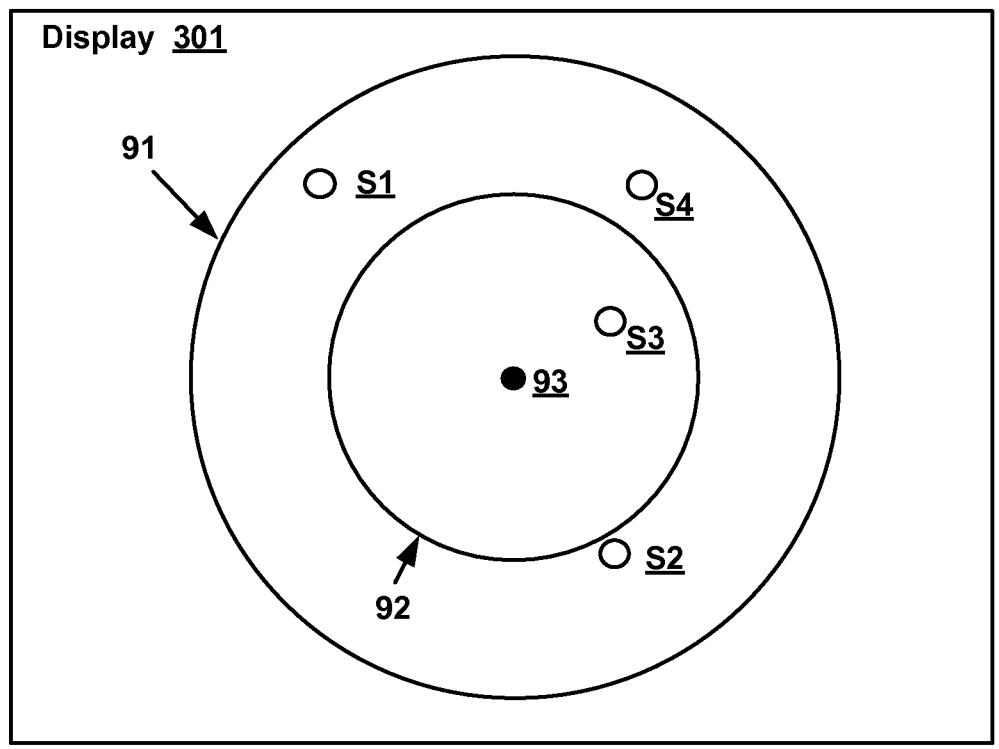
FIG. 10 depicts a screen shot of an exemplary display corresponding to the positions of GPS satellites (including any other GNSS such as Galileo™), according to an embodiment of the present invention.

FIG. 10 depicts a screen shot of an exemplary display 301 corresponding to the positions of GPS satellite from which a signal, displayed according to signal strength on a bar graph 1010, according to an embodiment of the present invention. Concentric rings 91 and 92 and dot 93 display relative azimuthal positions. Ring 91 represents the horizon surrounding the PED. Dot 93 represents straight overhead the PED, and ring 92 represents an elevation (e.g., position angle) of 45 degrees between the horizon and dead overhead.

Figure 11:
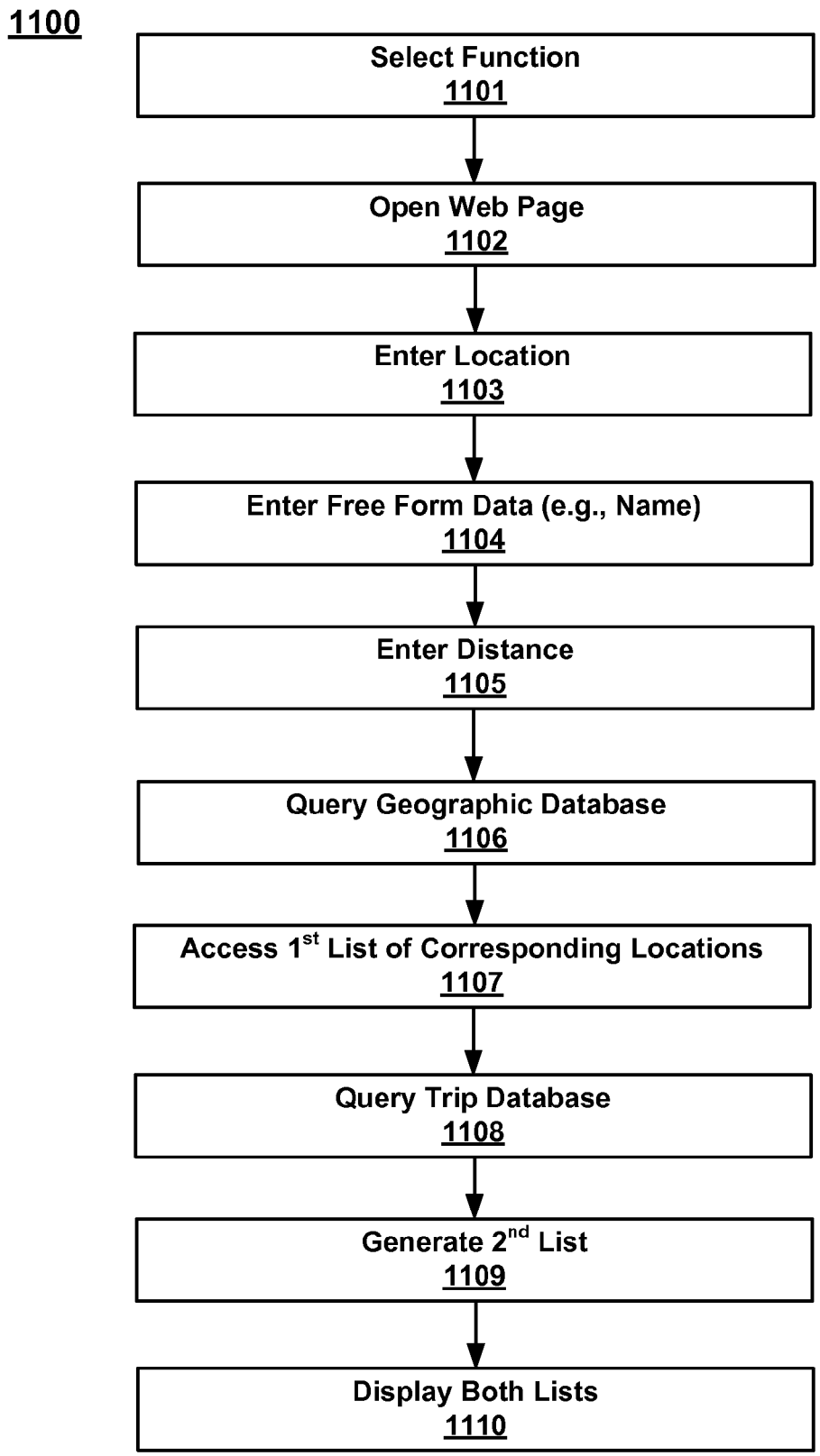
FIG. 11 is a flowchart of an exemplary computerized, network based process for accessing data relating to a location with reference to a free form input, according to an embodiment of the present invention.

FIG. 11 is a flowchart of an exemplary computerized, network based process 1100 for accessing data relating to a location with reference to a free form input, according to an embodiment of the present invention. Process 1100 begins with step 1101, wherein a search function is selected with a user interface such as a GUI.

In step 1102, a Web page, relating to the search function, is opened. In step 1103, a location relating to the trip is entered. In one embodiment, entering this location includes step 1104, wherein a free form data entry relating to the location is entered, e.g., with the interface. For instance, a name corresponding to the location can be entered.

In this embodiment, entering the location also includes step 1105, wherein a distance corresponding to the length of a radius around that location is entered. Responsive to entering the location (e.g., step 1103), in step 1106 a geographic database such as Terraserver™ is queried for a geographic position, e.g., a latitude and a longitude corresponding to that free form data entry.

In step 1107, a first list of locations corresponding to the free form data entry is accessed. Each listing on that first list comprises a geographic position corresponding thereto, wherein said first list is returned by the geographic database in response to the query. In step 1108, a trip database is searched for trips stored thereon that correspond to the first list within the specified radius.

Figure 12:
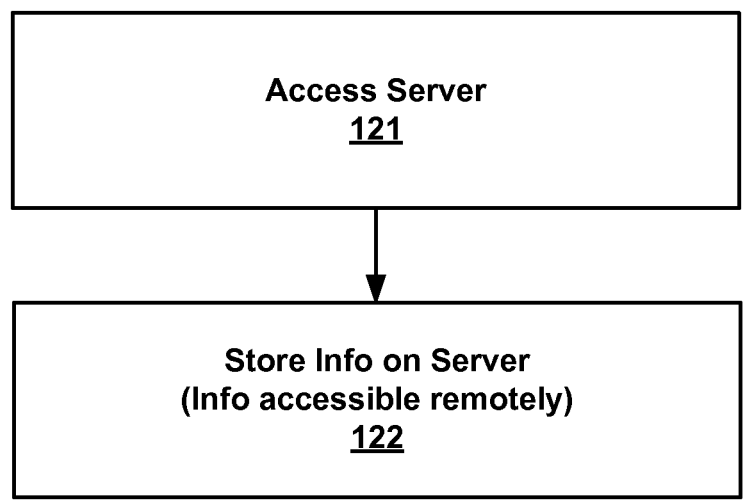
FIG. 12 is a flowchart of an exemplary computerized process for managing a trip, according to an embodiment of the present invention.

In step 1109, a second list comprising corresponding trips (e.g., all such trips) stored on the trips server is generated. In step 1110, both lists are displayed to allow a user to access the data, completing process 1100. FIG. 12 is a flowchart of an exemplary computerized process 120 for managing a trip, according to an embodiment of the present invention. Process 120 begins with step 121, wherein a server is accessed, e.g., with a client computer networked thereto. In step 122, information relating to the trip is stored (e.g., placed) on the server. This information is then accessible remotely with a portable electronic device, such as a cellular telephone with position determining capability, a GPS with cellular telephone capability, a PDA and/or another computer with both cellular telephone and position determining capability.

In summary, systems, methods, and devices for performing a trip management function are disclosed. A client computer accesses a server networked therewith to retrieve and store data, such as Web documents, relating to the trip. A wireless device interface allows a portable device, wirelessly coupled with a cellular telephone system with the network, to download the Web document. The portable device has cellular telephone functionality, geo-locating functionality, such as GPS capability, for determining its geo-location, and a processor for processing the Web document to help manage the trip. The Web document can include a set of map tiles, which encompass a particular geo-location area, and which form a dynamic map display. As the geo-location of the device changes, the next sequential map tile is downloaded and processed for displayed thereon.

Embodiments of the present invention described above thus relate to systems, methods, and devices for performing a trip management function. While the present invention has been described in particular exemplary embodiments, the present invention should not be construed as limited by such embodiments, but rather construed according to the following claims and their equivalents.

What is claimed is:

1. A Web based application system for managing a trip, the system comprising:

a graphical user interface configured to allow a client computer coupled to a network to access a server computer to retrieve and store data relating to said trip therewith and said server computer configured to retrieve at least one map, said graphical user interface further configured to facilitate generating by said client computer a search relating to said trip, wherein said search comprises a location name and a radius around a location corresponding to said location name;

one or more interactive windows functioning with said graphical user interface to perform said retrieving and said storing, wherein said data comprise a Web document that includes a first list comprising a plurality of locations within said radius of said location corresponding to said location name, and a second list comprising stored trip data relating to said plurality of locations from said first list, and wherein said graphical user interface and said interactive windows comprise a first application;

a wireless device interface configured to allow a portable device wirelessly coupled, via a cellular telephone system, with said network to access said Web document, wherein said portable device comprises:

a cellular telephone functionality configured to wirelessly couple with said cellular telephone system and download said Web document;

a geo-locating functionality operable with said cellular telephone functionality for determining a geographic location of said portable device, wherein said portable device accesses a signal relating to said geographic location, said signal generated by a system for determining and reporting said geographic location; and a processor configured for processing said Web document, wherein said processing helps plan, journal, map, manage and execute said trip, wherein said trip is a new trip, wherein said downloading and processing said Web document comprise a second application, wherein based configured on said determined geographic location of said portable device said processor is further to dynamically download a portion of said Web document associated with said determined geographic location of said portable device, and wherein said processor is further configured to dynamically display a plurality of map tiles on said portable electronic device such that, as said geographic location changes to a new geographic location, a next sequential map tile corresponding to said new geographic location is automatically downloaded from said server and displayed on said portable electronic device;

wherein the wireless device interface is further configured to bill a user of said portable device for performing said accessing said Web document.

2. A computer implemented method for managing a trip, the method comprising:

storing data relating to said trip with a server coupled with a network wherein said data are stored as a Web document; and upon an authorized portable device accessing said server with a cellular telephone system and providing a geographic location of said portable device as autonomously determined by said portable device:

generating a search relating to said trip, wherein said search comprises a location name and a radius around a location corresponding to said location name:

downloading said Web document to said portable device from said server, wherein said Web document comprises a portion of said data relating to said trip that is associated with said geographic location of said portable device and dynamically downloaded based on said geographic location, wherein said Web document includes a first list comprising a plurality of locations within said radius of said location corresponding to said location name, and a second list comprising stored trip data relating to said plurality of locations from said first list, wherein said data relating to said trip comprises a plurality of map tiles dynamically displayed on said portable electronic device such that, as said geographic location changes to a new geographic location, a next sequential map tile corresponding to said new geographic location is automatically downloaded from said server and displayed on said portable electronic device, and wherein said Web document provides data to support trip planning and management taking place at said authorized portable device and wherein said trip is a new trip; and billing a user of said portable device for performing said accessing said server.

3. The computer implemented method as recited in claim 2 wherein said portable device comprises:

a cellular telephone functionality for wirelessly coupling with said cellular telephone system;

a geo-locating functionality operable with said cellular telephone functionality for determining said geographic location of said portable device wherein said device accesses a signal relating to said geographic location, said signal generated by a system for determining and reporting said geographic location; and a processor for processing said Web document wherein said processing helps manage said trip.

4. The computer implemented method as recited in claim 3 wherein said portable device comprises one or more of:

a cellular telephone wherein said geo-locating function is performed with a position determining functionality;

a handheld position determining device, wherein said handheld position determining device comprises functionality for performing a cellular telephone function; and a computer comprising functionality for performing a cellular telephone function and said geo-locating function.

5. The computer implemented method as recited in claim 2 wherein each map tile of said plurality of map tiles comprises a border, wherein said border comprises a boundary separating one said map tile from another said map tile, and wherein said boundary corresponds to a substantially linear contour of a geographical area circumscribed by said border.

6. The computer implemented method as recited in claim 2 wherein said data relating to said trip relates to an elevation.

7. The computer implemented method as recited in claim 6 wherein said data relating to said trip comprises a contour map.

8. The computer implemented method as recited in claim 2 wherein said data relating to said trip comprises a graphical image.

9. The computer implemented method as recited in claim 8 wherein said graphical image comprises an aerial/space photograph.

10. The computer implemented method as recited in claim 2 wherein said data relating to said trip is a Hypertext Markup Language document or a Wireless Markup Language document.

11. The computer implemented method as recited in claim 2 wherein said billing is based on a subscription, a pay per use, or a promotion.

12. The Web based application system of claim 1 wherein said billing is based on a subscription, a pay per use, or a promotion.

* * * * *